United States Patent
Yin

(10) Patent No.: US 10,996,501 B1
(45) Date of Patent: May 4, 2021

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventor: Bingkun Yin, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/981,948

(22) PCT Filed: Jul. 20, 2020

(86) PCT No.: PCT/CN2020/102982
§ 371 (c)(1),
(2) Date: Sep. 17, 2020

(30) Foreign Application Priority Data

Jun. 23, 2020 (CN) .................. 202010578227.X

(51) Int. Cl.
*G02F 1/1335* (2006.01)
*G02F 1/1337* (2006.01)

(52) U.S. Cl.
CPC ...... *G02F 1/133504* (2013.01); *G02F 1/1337* (2013.01); *G02F 1/133514* (2013.01); *G02F 1/133548* (2021.01); *G02F 1/133553* (2013.01)

(58) Field of Classification Search
CPC .................................................. G02F 1/133504
See application file for complete search history.

(56) References Cited

U.S. PATENT DOCUMENTS

| | | | |
|---|---|---|---|
| 2004/0080926 A1* | 4/2004 | Chen | G02B 6/0056 362/609 |
| 2007/0047214 A1* | 3/2007 | Nesterenko | G02B 6/0056 362/19 |
| 2019/0179185 A1* | 6/2019 | Oh | G02F 1/1337 |

* cited by examiner

*Primary Examiner* — Edmond C Lau

(57) ABSTRACT

Embodiments of the present disclosure provide a display panel and a display device. In the display panel, by disposing a light source on a lateral side of a first base substrate, using the first base substrate as a light guiding plate, and respectively disposing a metal wire grid and a second metal wire grid on a lateral side of the first base substrate and under the first base substrate, light is emitted upwards. Moreover, a diffuse reflection layer and an optical structure layer are disposed on the first substrate, so that there is no need to dispose a backlight module. Due to no need for a reflective film and a backlight structure, the display panel achieves transparent display.

20 Claims, 4 Drawing Sheets

DISPLAY PANEL AND DISPLAY DEVICE

FIELD OF INVENTION

The present disclosure relates to the technical field of displays, and in particular to a display panel and a display device.

BACKGROUND OF DISCLOSURE

With the development of display technology, liquid crystal display products are applied in various fields. However, due to structural limitations of a backlight module and a backlight reflective layer in an existing liquid crystal display panel, the existing liquid crystal display panel is relatively thick and cannot achieve transparent display. As shown in FIG. 1, an existing side-in type backlight module includes a reflective film, lattice dots, light-emitting diodes, a light guiding plate, a diffusion sheet and a prism sheet. Due to the existence of the reflective film and the limitation of the backlight structure, the liquid crystal display product composed of the backlight module, the display panel is relatively thick, and the liquid crystal display product cannot achieve a transparent display.

Therefore, the existing liquid crystal display products have technical problems that the backlight module is not transparent, and the backlight module is relatively thick, which results in thick liquid crystal display products and cannot achieve transparent display.

SUMMARY OF INVENTION

Technical Problem

The embodiments of the present disclosure provide a display panel and a display device to solve the technical problem of the existing liquid crystal display products that the backlight module is not transparent and the backlight module is thick, which results in thick liquid crystal display products and cannot achieve transparent display.

Technical Solutions

To solve the above problems, the technical solutions provided by this application are as follows:

An embodiment of the present disclosure provides a display panel, comprising a first substrate, a second substrate, and a liquid crystal layer disposed between the first substrate and the second substrate arranged in a cell, wherein the first substrate includes a first base substrate, a first metal layer, a second metal layer, a diffuse reflection layer, an optical structure layer, a driving circuit layer, and a first alignment layer;

the first metal layer is etched to form a first metal wire grid, the first metal wire grid is arranged on a lateral side of the first base substrate, the first metal wire grid is configured to control light in a first direction emitted from a light source, the second metal layer is etched to form a second metal wire grid, the second metal wire grid is arranged under the first base substrate to prevent the light in the first direction from transmitting through a bottom of the first base substrate, the diffuse reflection layer is disposed on the first base substrate, and configured to diffusely reflect the light, the optical structure layer is disposed on the diffuse reflection layer, and is configured to uniformly transmit the light, the drive circuit layer is disposed on the optical structure layer, and the first alignment layer is disposed on the driving circuit layer;

wherein the second substrate includes a second alignment layer, a color resist layer, and a second base substrate, the second alignment layer is disposed on the liquid crystal layer, and the color resist layer is disposed on the second alignment layer, and the second base substrate is disposed on the color resist layer.

In an embodiment, the light source comprises a blue light emitting diode.

In an embodiment, the diffuse reflection layer includes lattice dots arranged in an array.

In an embodiment, the dots include concave dots and convex dots.

In an embodiment, the display panel further comprises pixel units, each of the pixel units comprises a sub-pixel unit, and a width of the dots is smaller than or equal to a width of the sub-pixel units.

In an embodiment, the optical structure layer comprises a diffusion sheet and a prism sheet, and the prism sheet is disposed on the diffusion sheet.

In an embodiment, a refractive index of the optical structure layer is smaller than a refractive index of the lattice dots.

In an embodiment, the second alignment layer comprises a third metal layer, the third metal layer is etched to form a third metal wire grid, and the third metal wire grid is disposed between the liquid crystal layer and the color resist layer.

In an embodiment, a structure of the third metal wire grid is same as a structure of the second metal wire grid, and a projection of the third metal wire grid projected on the first base substrate coincides with a projection of the second metal wire grid projected on the first base substrate.

In an embodiment, the color resist layer includes a color filter layer and a quantum dot layer disposed under the color filter layer, and the color filter layer includes a first color resist, a second color resist, and a transparent color resist.

In an embodiment, the first color resist comprises one of a red color resist, a green color resist, and a blue color resist, and the second color resist includes one of a red color resist, a green color resist, and a blue resist, and a color of the first color resist is different from a color of the second color resist.

In an embodiment, the color resist layer comprises a quantum dot layer, and the quantum dot layer comprises red light quantum dots and green light quantum dots.

Moreover, an embodiment of the present disclosure provides a display device, comprising a display panel and a light source, wherein:

the display panel including a first substrate, a second substrate, and a liquid crystal layer disposed between the first substrate and the second substrate arranged in a cell, wherein the first substrate includes a first base substrate, a first metal layer, a second metal layer, a diffuse reflection layer, an optical structure layer, a driving circuit layer, and a first alignment layer;

the first metal layer is etched to form a first metal wire grid, the first metal wire grid is arranged on a lateral side of the first base substrate, the first metal wire grid is configured to control light in a first direction emitted from a light source, the second metal layer is etched to form a second metal wire grid, the second metal wire grid is arranged under the first base substrate to prevent the light in the first direction from transmitting through a bottom of the first base substrate, the diffuse reflection layer is disposed on the first base substrate, and configured to diffusely reflect the light, the optical structure layer is disposed on the diffuse reflection layer, and is configured to uniformly transmit the light, the drive circuit layer is disposed on the optical structure layer, and the first alignment layer is disposed on the driving circuit layer;

wherein the second substrate includes a second alignment layer, a color resist layer, and a second base substrate, the second alignment layer is disposed on the liquid crystal layer, and the color resist layer is disposed on the second alignment layer, and the second base substrate is disposed on the color resist layer, wherein the light source is disposed near the lateral side of the first base substrate In an embodiment, the display device includes a middle frame, and the light source is disposed on the middle frame.

In an embodiment, a length of the first base substrate is greater than a length of the optical structure layer, and the light source is disposed on the first base substrate.

In an embodiment, the light source comprises a blue light emitting diode.

In an embodiment, the diffuse reflection layer comprises lattice dots arranged in an array.

In an embodiment, the optical structure layer comprises a diffusion sheet and a prism sheet, and the prism sheet is disposed on the diffusion sheet.

In an embodiment, the second alignment layer comprises a third metal layer, the third metal layer is etched to form a third metal wire grid, and the third metal wire grid is disposed between the liquid crystal layer and the color resist layer.

In an embodiment, the color resist layer includes a color filter layer and a quantum dot layer disposed under the color filter layer, and the color filter layer includes a first color resist, a second color resist, and a transparent color resist.

Beneficial Effect:

The embodiments of the present disclosure provide a display panel and a display device. The display panel includes a first substrate, a second substrate, and a liquid crystal layer disposed between the first substrate and the second substrate arranged in a cell, wherein the first substrate includes a first base substrate, a first metal layer, a second metal layer, a diffuse reflection layer, an optical structure layer, a driving circuit layer, and a first alignment layer; the first metal layer is etched to form a first metal wire grid, the first metal wire grid is arranged on a lateral side of the first base substrate, the first metal wire grid is configured to control light in a first direction emitted from a light source, the second metal layer is etched to form a second metal wire grid, the second metal wire grid is arranged under the first base substrate to prevent the light in the first direction from transmitting through a bottom of the first base substrate, the diffuse reflection layer is disposed on the first base substrate, and configured to diffusely reflect the light, the optical structure layer is disposed on the diffuse reflection layer, and is configured to uniformly transmit the light, the drive circuit layer is disposed on the optical structure layer, and the first alignment layer is disposed on the driving circuit layer; wherein the second substrate includes a second alignment layer, a color resist layer, and a second base substrate, the second alignment layer is disposed on the liquid crystal layer, and the color resist layer is disposed on the second alignment layer, and the second base substrate is disposed on the color resist layer. By disposing the light source on the lateral side of the first base substrate, using the first base substrate as the light guiding plate, and respectively disposing the first metal wire grid and the second metal wire grid on the lateral side of the first base substrate and under the first base substrate, light is transmitted upwards. Moreover, the diffuse reflection layer and the optical structure layer are disposed on the first substrate, so that there is no need to dispose the backlight module. Due to no need for the reflective sheet and the backlight structure, the display panel achieves transparent display. The technical problem of the existing liquid crystal display products is resolved that the backlight module is not transparent and the backlight module is thick, which results in thick liquid crystal display products and cannot achieve transparent display.

DETAILED DESCRIPTION OF PREFERRED EMBODIMENTS

The present disclosure provides a display panel and a display device. In order to make the objectives, technical solutions, and effects of the present disclosure clear, the present disclosure is further described in detail below with reference to the accompanying drawings and embodiments. It should be understood that the specific embodiments described herein are only used to explain the present disclosure, and not used to limit the present application.

The embodiment of the present disclosure addresses the technical problem in an existing liquid crystal display product that due to a non-transparent and thick backlight module, the liquid crystal display product is thick, and cannot achieve transparent display. Embodiments of the present disclosure can resolve the problem.

Figure 1:
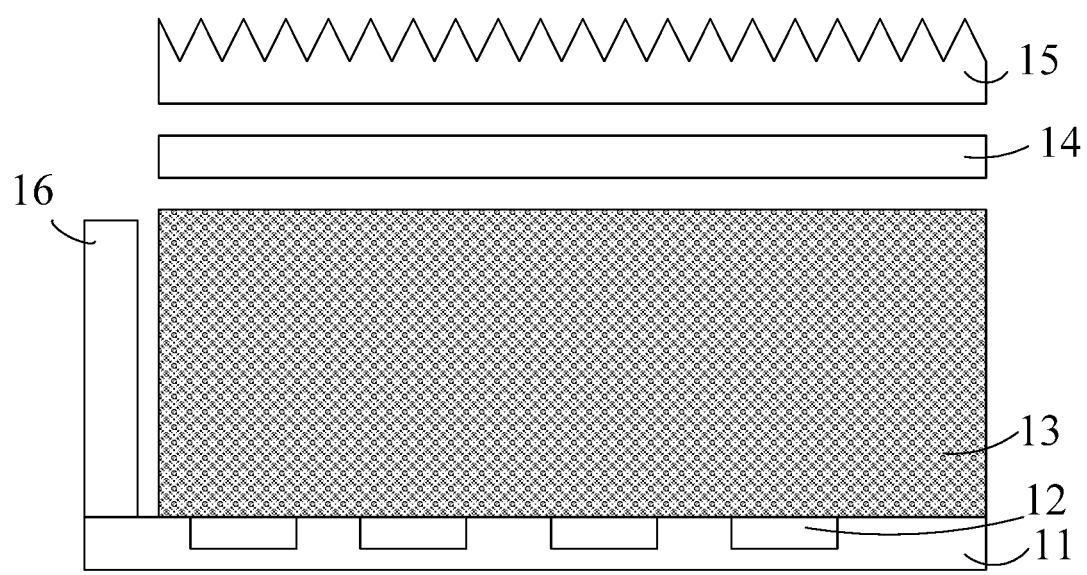
FIG. 1 is a schematic diagram of a conventional backlight module.

As shown in FIG. 1, a side-in type backlight module in the existing display product includes a reflective film 11, lattice dots 12, light-emitting diodes 16, a light guide plate 13, a diffusion sheet 14, and a prism sheet 15. In an existing display product, the backlight module is used to provide backlight, while the reflective structure is used to prevent the light from leaking downwards, and the reflective film does not transmit light. As a result, the display product cannot be transparent during display. Because the backlight module has a great number of film layers and is thick, resulting in a thick display product. Therefore, the technical problem exists in an existing liquid crystal display product that due to the non-transparent and thick backlight module, the liquid crystal display product is thick, and cannot achieve transparent display.

Figure 2:
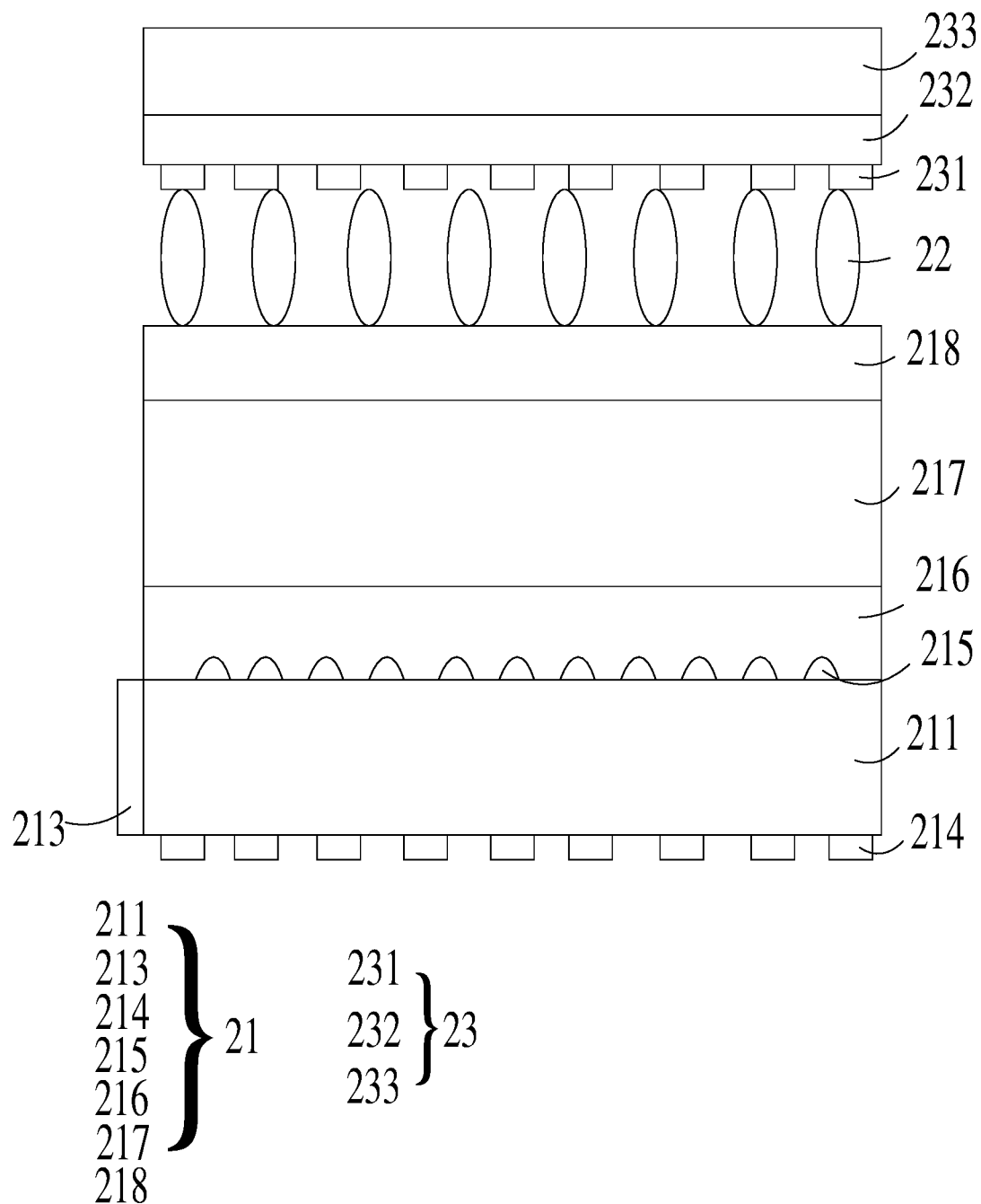
FIG. 2 is a schematic diagram of a display panel provided by an embodiment of the application.

As shown in FIG. 2, an embodiment of the present disclosure provides a display panel, including a first substrate 21, a second substrate 23, and a liquid crystal layer 22 disposed between the first substrate 21 and the second substrate 23 arranged in a cell.

The first substrate 21 includes a first base substrate 211, a first metal layer 213, a second metal layer 214, a diffuse reflection layer 215, an optical structure layer 216, a driving circuit layer 217, and a first alignment layer 218. The first metal layer 213 is etched to form a first metal wire grid, the first metal wire grid is arranged on a lateral side of the first base substrate 211, the first metal wire grid is configured to control light in a first direction emitted from a light source, the second metal layer 214 is etched to form a second metal wire grid, the second metal wire grid is arranged under the first base substrate 211 to prevent the light in the first direction from transmitting through a bottom of the first base substrate 211, the diffuse reflection layer 215 is disposed on the first base substrate, and configured to diffusely reflect the light, the optical structure layer 216 is disposed on the diffuse reflection layer 215, and is configured to uniformly transmit the light, the drive circuit layer 217 is disposed on the optical structure layer 216, and the first alignment layer 218 is disposed on the driving circuit layer 217.

The second substrate 231 includes a second alignment layer 231, a color resist layer 232, and a second base substrate 233. The second alignment layer 231 is disposed on the liquid crystal layer 22, and the color resist layer 232 is disposed on the second alignment layer 231, and the second base substrate 233 is disposed on the color resist layer 232.

The embodiments of the present disclosure provide a display panel and a display device. The display panel includes a first substrate, a second substrate, and a liquid crystal layer disposed between the first substrate and the second substrate arranged in a cell, wherein the first substrate includes a first base substrate, a first metal layer, a second metal layer, a diffuse reflection layer, an optical structure layer, a driving circuit layer, and a first alignment layer; the first metal layer is etched to form a first metal wire grid, the first metal wire grid is arranged on a lateral side of the first base substrate, the first metal wire grid is configured to control light in a first direction emitted from a light source, the second metal layer is etched to form a second metal wire grid, the second metal wire grid is arranged under the first base substrate to prevent the light in the first direction from transmitting through a bottom of the first base substrate, the diffuse reflection layer is disposed on the first base substrate, and configured to diffusely reflect the light, the optical structure layer is disposed on the diffuse reflection layer, and is configured to uniformly transmit the light, the drive circuit layer is disposed on the optical structure layer, and the first alignment layer is disposed on the driving circuit layer; wherein the second substrate includes a second alignment layer, a color resist layer, and a second base substrate, the second alignment layer is disposed on the liquid crystal layer, and the color resist layer is disposed on the second alignment layer, and the second base substrate is disposed on the color resist layer. By disposing the light source on the lateral side of the first base substrate, using the first base substrate as the light guiding plate, and respectively disposing the first metal wire grid and the second metal wire grid on the lateral side of the first base substrate and under the first base substrate, light is transmitted upwards. Moreover, the diffuse reflection layer and the optical structure layer are disposed on the first substrate, so that there is no need to dispose the backlight module. Due to no need for the reflective sheet and the backlight structure, the display panel achieves transparent display. The technical problem of the existing liquid crystal display products is resolved that the backlight module is not transparent and the backlight module is thick, which results in thick liquid crystal display products and cannot achieve transparent display.

In an embodiment, the light source includes a blue light emitting diode.

Upon selection of the light source, blue light emitting diodes can be selected as the light source, so that upon disposition of the color resist layer, blue light can be converted into red light and green light by quantum dots, for achieving color display without disposing three color resists of red, green and blue, which can simplify the process and reduce the process difficulty. Moreover, blue color resist materials are conserved. Furthermore, upon disposition of the quantum dots, the number and the types of quantum dots can also be reduced, thereby conserving materials, reducing costs and decreasing process difficulty.

In one embodiment, the diffuse reflection layer includes lattice dots arranged in an array, and the diffuse reflection layer is disposed on the first base substrate. The diffuse reflection layer is composed of the lattice dots arranged in the array, so that the emitted light passing through the lattice dots can be randomly emitted after passing through the lattice dots, and becomes light as emitted by a surface light source, avoiding light concentration, and rendering the light uniform during display. Thereby, display brightness is uniform. Moreover, the lattice dots can be randomly arranged to further ensure diffusive emission and uniformity of light.

In an embodiment, the lattice dots include concave dots and convex dots, and, that is, upon formation of the lattice dots, the lattice dots may be configured as concave dots, so that the dots are inwardly concave hemispheres. Therefore, when passing through the lattice dots, the light is diffusely reflected. Alternatively, the lattice dots may be configured as outwardly convex hemispheres. Upon configuring shapes of the lattice dots, the convex dots are formed by printing, and the concave dots are formed by laser. When the fact that the use of laser may damage other layers is taken into account, printing may be used to form lattice dots, which are outwardly convex dots.

In an embodiment, material of the lattice dots includes one of polymethyl methacrylate, polystyrene, polycarbonate, and polyethylene. Upon selection of the material of the lattice dots, material with high light transmittance is selected as the material of the lattice dots.

In an embodiment, the display panel includes pixel units, each of the pixel unit includes a sub-pixel unit, and a width of the lattice dots is smaller than or equal to a width of the sub-pixel units, so that the light can be diffused and diffusely reflected.

In an embodiment, the optical structure layer includes a diffusion sheet and a prism sheet, and the prism sheet is disposed on the diffusion sheet. Upon disposition of the optical structure layer, the diffusion sheet and the prism sheet may be directly used to form the optical structure layer. The diffusion sheet and the prism sheet enable the light to be uniformly transmitted, and there is no need to additionally design the structure of the optical structure layer.

In one embodiment, the optical structure layer is formed of plastics, and material of the optical structure layer includes at least one of polymethylmethacrylate, polystyrene, polycarbonate, polyethylene, polypropylene, polyvinyl chloride, polyethylene terephthalate and acrylic. Upon designing the optical structure layer, in order to reduce a thickness of the optical structure layer, the plastics may be used to form the optical structure layer, so that the optical structure layer is thin, and light transmittance of the optical structure layer is relatively high. Moreover, the plastics are processed, so that the light passing through the optical structure layer can be uniformly transmitted.

In an embodiment, light transmittance of the optical structure layer and the lattice dots is greater than 95%, and materials with high light transmittance are used to form the optical structure layer and the lattice dots, so that the light transmittance of the display panel is high, thereby achieving transparent display.

In an embodiment, a refractive index of the optical structure layer is less than a refractive index of the lattice dots. By controlling the refractive index of the optical structure layer and the lattice dots, light is transmitted along a direction of the second base substrate, avoiding light loss.

In an embodiment, the second alignment layer includes a third metal layer, the third metal layer is etched to form a third metal wire grid, and the third metal wire grid is disposed on the liquid crystal layer and the color resist layer. Upon disposition of the second alignment layer, the third metal wire grid is used to replace an alignment layer on a side of the color resist layer, and the third metal wire grid is used as the alignment layer, thereby eliminating the need to provide the alignment layer on the side of the color resist layer. The thickness of the display panel is further reduced, and the third metal wire grid can be used as a polarizer to control transmission of the light without providing a polarizer, thereby reducing the thickness of the display panel.

In an embodiment, a structure of the third metal wire grid is same as a structure of the second metal wire grid, and a projection of the third metal wire grid projected on the first base substrate coincides with a projection of the second metal wire grid projected on the first base substrate coincide. That is, upon disposition of the third metal wire grid, the structure of the second metal wire grid is the same as the structure of the third metal wire grid, the second metal wire grid replaces the polarizer on the side of the driving circuit layer, and the third metal wire grid replaces the polarizer of the color resist layer, thereby reducing the thickness of the display panel. There is no need to dispose the polarizers near both sides of the display panel, and the third metal wire grid can be used as the alignment layer to reduce the thickness of the display panel.

In an embodiment, materials of the first metal wire grid, the second metal wire grid, and the third metal wire grid are the same. Upon selection of materials of the metal wire grids, same material may be used for the first metal wire grid, the second metal wire grid, and the third metal wire grid, which are convenient for design and preparation.

In an embodiment, material of the third metal wire grid includes one of aluminum, copper, and chromium. Upon selection of material of the metal wire grid, when high performance of aluminum is taken into account, aluminum may be selected as the material of the metal wire grid, but the embodiment of the present disclosure is not limited thereto, and other metal materials may also be used as the material of the metal wire grid.

It should be noted that in the embodiments of the present disclosure, since the first metal wire grid, the second metal wire grid, and the third metal wire grid are all nano-level metal wires, the first metal layer, the second metal layer, and the third metal layer are transparent layers.

In an embodiment, the color resist layer includes red color resist, blue color resist, and green color resist. When a white light emitting diodes is used, since the color resist layer is composed of the red color resist, the blue color resist, and the green color resist, the display panel displays a color image.

In an embodiment, the color resist layer includes a color filter layer and a quantum dot layer disposed under the color filter layer, and the color filter layer includes a first color resist, a second color resist, and a transparent color resist. The quantum dot layer is used to convert the light emitted by the light source into light in other colors. For example, when the light source is red light, the first color resist and the second color resist are respectively a green color resist and a blue color resist, so that the light passing through the color resist layer is color light, achieving color display.

In an embodiment, the first color resist includes one of a red color resist, a green color resist, and a blue color resist, and the second color resist includes a red color resist, a green color resist, and a blue color resist. The color of the first color resist is different from the color of the second color resist. That is, based upon the different light sources, the first color resist and the second color resist are different, thereby achieving color display.

In an embodiment, the color resist layer includes a color filter layer and a quantum dot layer disposed under the color filter layer, and the color filter layer includes a red color resist, a green color resist, and a transparent color. When a blue light emitting diode is used as the light source, the quantum dot layer can be used to convert blue light into red light and green light. Furthermore, the red color resist is disposed in a region corresponding to a red sub-pixel, the green color resist is disposed in a region corresponding to a green sub-pixel, and the transparent color resist is disposed in a region corresponding to a blue sub-pixel. Thus, after the light passes through the red color resist and the green color resist, red light and green light are emitted, and blue light is emitted through the transparent color resist region, so that color light is emitted after passing through the color resist layer, to realize color display.

In an embodiment, the color resist layer includes a quantum dot layer, the quantum dot layer includes red light quantum dots and green light quantum dots, and the quantum dot layer is divided into a red quantum dot layer, a green quantum dot layer, and a colorless quantum dot layer. That is, the quantum dot layer is divided into the red quantum dot layer, the green quantum dot layer, and the colorless quantum dot layer based upon the red sub-pixel region, the green sub-pixel region, and the blue sub-pixel region. The red quantum dots are arranged in the red quantum dot layer, the green quantum dots are arranged in the green quantum dot layer, and no quantum dot is arranged in the colorless quantum dot layer. Color display is achieved after the light passes through the quantum dot layer.

In an embodiment, the quantum dot material includes a hydrogel loaded quantum dot structure, QD@MOFs, CdSe-SiO2, II-VIA, III-VA QD nanorods, dot-in-rod QD core-shell structure nanorods, double-emission and triple-emission quantum dot materials, and perovskite quantum dots. The quantum dots include the red light quantum dots and the green light quantum dots, and both the red light quantum dots and the green light quantum dots include a light emitting core and an inorganic protective shell. Material of the light emitting core of the green light quantum dot includes ZnCdSe2, InP, Cd2SSe and other materials, material of the light emitting core of the red light quantum dot includes CdSe, Cd2SeTe, InAs and other materials, and the inorganic protective shells of the red light quantum dot and the green light quantum dot both include CdS, ZnSe, ZnCdS2, ZnS, ZnO and other materials.

In an embodiment, the driving circuit layer includes a buffer layer, a semiconductor layer, a gate insulating layer, a gate layer, an interlayer insulating layer, a source and drain layer, a planarization layer, and a pixel electrode layer.

In an embodiment, the display panel further includes a common electrode layer.

Figure 3:
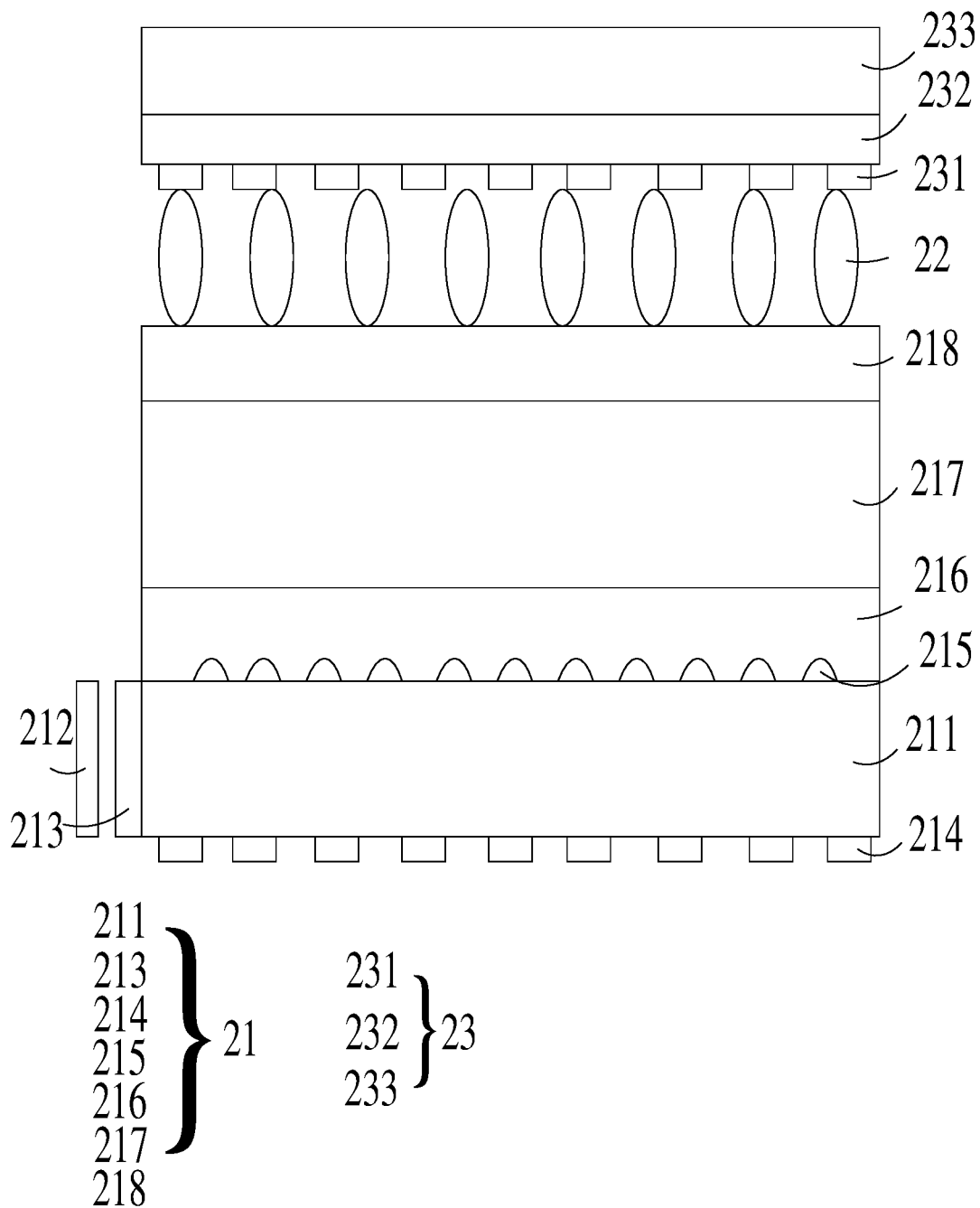
FIG. 3 is a schematic diagram of a display device provided by an embodiment of the application.

As shown in FIG. 3, an embodiment of the present disclosure provides a display device. The display device comprises a display panel and a source 212.

The display panel includes a first substrate 21, a second substrate 23, and a liquid crystal layer 22 disposed between the first substrate 21 and the second substrate 23 arranged in a cell.

The first substrate 21 includes a first base substrate 211, a first metal layer 213, a second metal layer 214, a diffuse reflection layer 215, an optical structure layer 216, a driving circuit layer 217, and a first alignment layer 218. The first metal layer 213 is etched to form a first metal wire grid, the first metal wire grid is arranged on a lateral side of the first base substrate 211, the first metal wire grid is configured to control light in a first direction emitted from a light source, the second metal layer 214 is etched to form a second metal wire grid, the second metal wire grid is arranged under the first base substrate 211 to prevent the light in the first direction from transmitting through a bottom of the first base substrate 211, the diffuse reflection layer 215 is disposed on the first base substrate, and configured to diffusely reflect the light, the optical structure layer 216 is disposed on the diffuse reflection layer 215, and is configured to uniformly transmit the light, the drive circuit layer 217 is disposed on the optical structure layer 216, and the first alignment layer 218 is disposed on the driving circuit layer 217.

The second substrate 231 includes a second alignment layer 231, a color resist layer 232, and a second base substrate 233. The second alignment layer 231 is disposed on the liquid crystal layer 22, and the color resist layer 232 is disposed on the second alignment layer 231, and the second base substrate 233 is disposed on the color resist layer 232.

The light source 212 is disposed near the lateral side of the first base substrate 211.

In an embodiment, the display device includes a middle frame, and the light source is disposed on the middle frame. By disposing the light source on the middle frame, upon manufacture of the display device, the light source is located on the lateral side of the first base substrate, so that the light source does not occupy much space of the display panel and does not affect the display panel.

In an embodiment, a length of the first base substrate is greater than a length of the optical structure layer, and the light source is disposed on the first base substrate. Upon disposition of the light source, the first base substrate can be extended, and the light source is disposed on the first base substrate, thereby conserving space.

In an embodiment, the light source includes the blue light emitting diode in the display device.

In an embodiment, the diffuse reflection layer includes lattice dots arranged in an array in the display device.

In an embodiment, the optical structure layer comprises a diffusion sheet and a prism sheet, and the prism sheet is disposed on the diffusion sheet.

In an embodiment, the second alignment layer comprises a third metal layer, the third metal layer is etched to form a third metal wire grid, and the third metal wire grid is disposed between the liquid crystal layer and the color resist layer.

In an embodiment, the color resist layer includes a color filter layer and a quantum dot layer disposed under the color filter layer, and the color filter layer includes a first color resist, a second color resist, and a transparent color resist.

Figure 4:
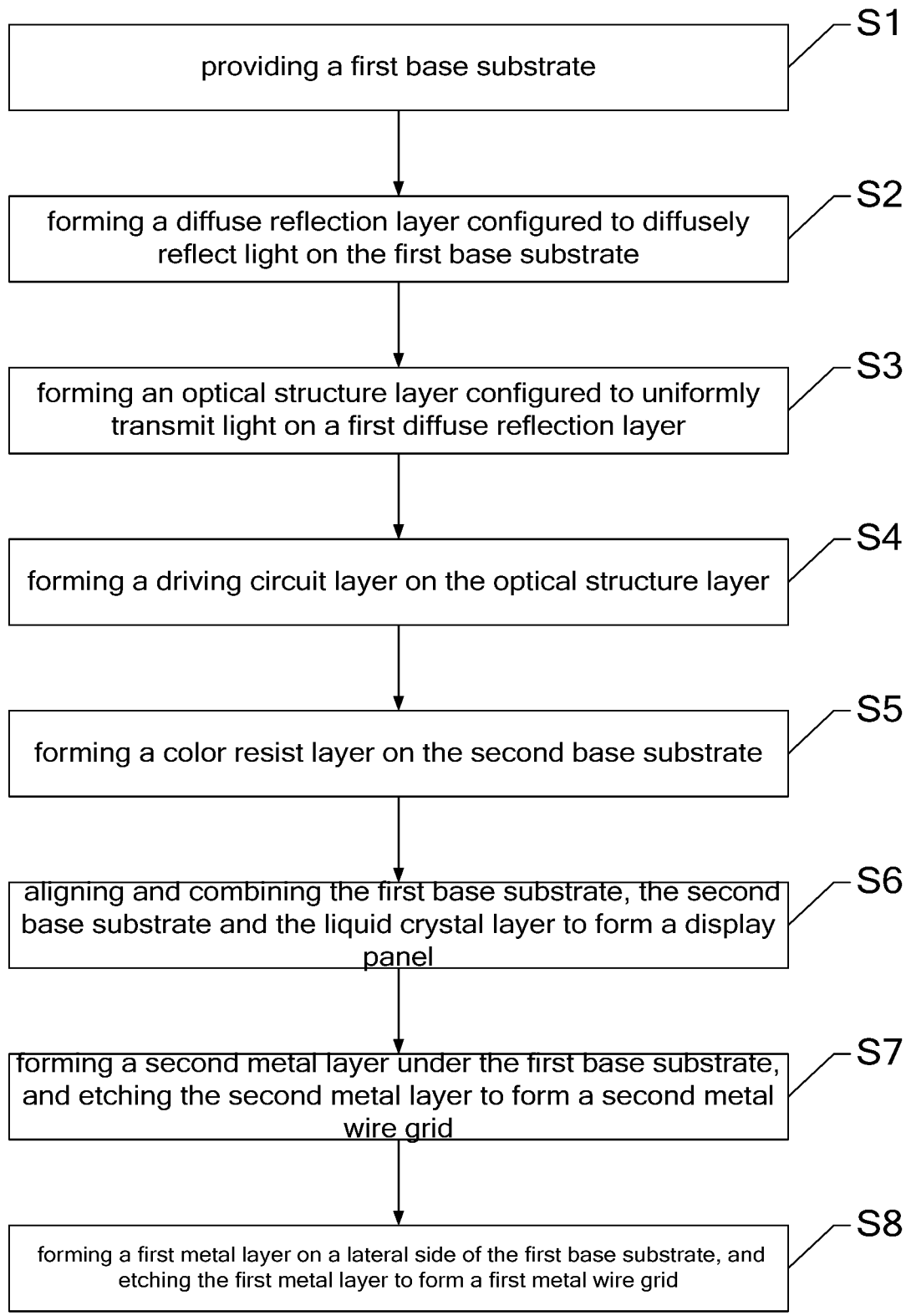
FIG. 4 is a flowchart of a method for manufacturing a display panel provided by an embodiment of the application.

As shown in FIG. 4, an embodiment of the present disclosure provides a method for preparing a display panel, and the method for preparing a display panel includes:

Step S1 of providing a first base substrate;

Step S2 of forming a diffuse reflection layer configured to diffusely reflect light on the first base substrate;

Step S3 of forming an optical structure layer configured to uniformly transmit light on a first diffuse reflection layer;

Step S4 of forming a driving circuit layer on the optical structure layer;

Step S5 of forming a color resist layer on the second base substrate;

Step S6 of aligning and combining the first base substrate, the second base substrate and the liquid crystal layer to form a display panel;

Step S7 of forming a second metal layer under the first base substrate, and etching the second metal layer to form a second metal wire grid;

Step S8 of forming a first metal layer on a lateral side of the first base substrate, and etching the first metal layer to form a first metal wire grid.

An embodiment of the present disclosure provides a method for manufacturing a display panel. The display panel manufactured by the method for manufacturing the display panel includes a first substrate, a second substrate, and a liquid crystal layer disposed between the first substrate and the second substrate arranged in a cell, wherein the first substrate includes a first base substrate, a first metal layer, a second metal layer, a diffuse reflection layer, an optical structure layer, a driving circuit layer, and a first alignment layer; the first metal layer is etched to form a first metal wire grid, the first metal wire grid is arranged on a lateral side of the first base substrate, the first metal wire grid is configured to control light in a first direction emitted from a light source, the second metal layer is etched to form a second metal wire grid, the second metal wire grid is arranged under the first base substrate to prevent the light in the first direction from transmitting through a bottom of the first base substrate, the diffuse reflection layer is disposed on the first base substrate, and configured to diffusely reflect the light, the optical structure layer is disposed on the diffuse reflection layer, and is configured to uniformly transmit the light, the drive circuit layer is disposed on the optical structure layer, and the first alignment layer is disposed on the driving circuit layer; wherein the second substrate includes a second alignment layer, a color resist layer, and a second base substrate, the second alignment layer is disposed on the liquid crystal layer, and the color resist layer is disposed on the second alignment layer, and the second base substrate is disposed on the color resist layer. By disposing the light source on the lateral side of the first base substrate, using the first base substrate as the light guiding plate, and respectively disposing the first metal wire grid and the second metal wire grid on the lateral side of the first base substrate and under the first base substrate, light is transmitted upwards. Moreover, the diffuse reflection layer and the optical structure layer are disposed on the first substrate, so that there is no need to dispose the backlight module. Due to no need for the reflective sheet and the backlight structure, the display panel achieves transparent display. The technical problem of the existing liquid crystal display products is resolved that the backlight module is not transparent and the backlight module is thick, which results in thick liquid crystal display products and cannot achieve transparent display.

In an embodiment, the step of forming the diffuse reflection layer on the first base substrate includes a step of forming lattice dots on the first base substrate using a laser or a printing process.

In an embodiment, the step of forming the optical structure layer on the first diffuse reflection layer includes a step of forming an optical structure on the lattice dots by coating, imprinting, and curing processes to obtain the optical structure layer.

In an embodiment, the step of forming the color resist layer on the second base substrate includes a step of coating a quantum dot material on the second base substrate to form a quantum dot layer.

In an embodiment, the step of aligning and combining the first base substrate, the second base substrate, and the liquid crystal layer to form the display panel includes:

a step of depositing a third metal layer on the quantum dot layer, and forming a third metal wire grid by nanoimprinting and etching; and a step of forming liquid crystals on the third metal wire grid;

a step of aligning and combining the first base substrate, the second base substrate and the liquid crystal layer to form the display panel.

In an embodiment, the step of forming the second metal layer under the first base substrate and etching the second metal layer to form the second metal wire grid includes:

a step of forming the second metal layer under the first base substrate, and forming the second metal wire grid by nano-imprinting and etching.

In an embodiment, the step of forming the first metal layer on the lateral side of the first base substrate and etching the first metal layer to form the first metal wire grid includes:

a step of forming the first metal layer on the lateral side of the first base substrate, and forming the first metal wire grid by nano-imprinting and etching.

Based upon the aforementioned embodiments, it is known that:

The embodiments of the present disclosure provide a display panel and a display device. The display panel includes a first substrate, a second substrate, and a liquid crystal layer disposed between the first substrate and the second substrate arranged in a cell, wherein the first substrate includes a first base substrate, a first metal layer, a second metal layer, a diffuse reflection layer, an optical structure layer, a driving circuit layer, and a first alignment layer; the first metal layer is etched to form a first metal wire grid, the first metal wire grid is arranged on a lateral side of the first base substrate, the first metal wire grid is configured to control light in a first direction emitted from a light source, the second metal layer is etched to form a second metal wire grid, the second metal wire grid is arranged under the first base substrate to prevent the light in the first direction from transmitting through a bottom of the first base substrate, the diffuse reflection layer is disposed on the first base substrate, and configured to diffusely reflect the light, the optical structure layer is disposed on the diffuse reflection layer, and is configured to uniformly transmit the light, the drive circuit layer is disposed on the optical structure layer, and the first alignment layer is disposed on the driving circuit layer; wherein the second substrate includes a second alignment layer, a color resist layer, and a second base substrate, the second alignment layer is disposed on the liquid crystal layer, and the color resist layer is disposed on the second alignment layer, and the second base substrate is disposed on the color resist layer. By disposing the light source on the lateral side of the first base substrate, using the first base substrate as the light guiding plate, and respectively disposing the first metal wire grid and the second metal wire grid on the lateral side of the first base substrate and under the first base substrate, light is transmitted upwards. Moreover, the diffuse reflection layer and the optical structure layer are disposed on the first substrate, so that there is no need to dispose the backlight module. Due to no need for the reflective sheet and the backlight structure, the display panel achives transparent display. The technical problem of the existing liquid crystal display products is resolved that the backlight module is not transparent and the backlight module is thick, which results in thick liquid crystal display products and cannot achieve transparent display.

It is understood that for those of ordinary skill in the art, equivalent replacements or modifications can be made in accordance with the technical solutions of the present disclosure and the inventive concept thereof, and all these modifications or replacements shall fall within the claimed scope of the appended claims of the present disclosure.

What is claimed is:

1. A display panel, comprising a first substrate, a second substrate, and a liquid crystal layer disposed between the first substrate and the second substrate arranged in a cell,
   wherein the first substrate includes a first base substrate, a first metal layer, a second metal layer, a diffuse reflection layer, an optical structure layer, a driving circuit layer, and a first alignment layer;
   the first metal layer is etched to form a first metal wire grid, the first metal wire grid is arranged on a lateral side of the first base substrate, the first metal wire grid is configured to control light in a first direction emitted from a light source, the second metal layer is etched to form a second metal wire grid, the second metal wire grid is arranged under the first base substrate to prevent the light in the first direction from transmitting through a bottom of the first base substrate, the diffuse reflection layer is disposed on the first base substrate, and configured to diffusely reflect the light, the optical structure layer is disposed on the diffuse reflection layer, and is configured to uniformly transmit the light, the drive circuit layer is disposed on the optical structure layer, and the first alignment layer is disposed on the driving circuit layer;
   wherein the second substrate includes a second alignment layer, a color resist layer, and a second base substrate,
   the second alignment layer is disposed on the liquid crystal layer, and the color resist layer is disposed on the second alignment layer, and the second base substrate is disposed on the color resist layer.

2. The display panel as claimed in claim 1, wherein the light source comprises a blue light emitting diode.

3. The display panel as claimed in claim 2, wherein the diffuse reflection layer includes lattice dots arranged in an array.

4. The display panel as claimed in claim 3, wherein the dots include concave dots and convex dots.

5. The display panel as claimed in claim 3, further comprising pixel units, each of the pixel units comprises a sub-pixel unit, and a width of the dots is smaller than or equal to a width of the sub-pixel units.

6. The display panel as claimed in claim 3, wherein
   the optical structure layer comprises a diffusion sheet and a prism sheet, and the prism sheet is disposed on the diffusion sheet.

7. The display panel as claimed in claim 6, wherein
   a refractive index of the optical structure layer is smaller than a refractive index of the lattice dots.

8. The display panel as claimed in claim 1, wherein the second alignment layer comprises a third metal layer, the third metal layer is etched to form a third metal wire grid, and the third metal wire grid is disposed between the liquid crystal layer and the color resist layer.

9. The display panel as claimed in claim 8, wherein a structure of the third metal wire grid is same as a structure of the second metal wire grid, and a projection of the third metal wire grid projected on the first base substrate coincides with a projection of the second metal wire grid projected on the first base substrate.

10. The display panel as claimed in claim 1, wherein the color resist layer includes a color filter layer and a quantum dot layer disposed under the color filter layer, and the color filter layer includes a first color resist, a second color resist, and a transparent color resist.

11. The display panel as claimed in claim 10, wherein the first color resist comprises one of a red color resist, a green color resist, and a blue color resist, and the second color resist includes one of a red color resist, a green color resist, and a blue resist, and a color of the first color resist is different from a color of the second color resist.

12. The display panel as claimed in claim 1, wherein the color resist layer comprises a quantum dot layer, and the quantum dot layer comprises red light quantum dots and green light quantum dots.

13. A display device, comprising a display panel and a light source, wherein:
the display panel including a first substrate, a second substrate, and a liquid crystal layer disposed between the first substrate and the second substrate arranged in a cell,
wherein the first substrate includes a first base substrate, a first metal layer, a second metal layer, a diffuse reflection layer, an optical structure layer, a driving circuit layer, and a first alignment layer;
the first metal layer is etched to form a first metal wire grid, the first metal wire grid is arranged on a lateral side of the first base substrate, the first metal wire grid is configured to control light in a first direction emitted from a light source, the second metal layer is etched to form a second metal wire grid, the second metal wire grid is arranged under the first base substrate to prevent the light in the first direction from transmitting through a bottom of the first base substrate, the diffuse reflection layer is disposed on the first base substrate, and configured to diffusely reflect the light, the optical structure layer is disposed on the diffuse reflection layer, and is configured to uniformly transmit the light, the drive circuit layer is disposed on the optical structure layer, and the first alignment layer is disposed on the driving circuit layer;
wherein the second substrate includes a second alignment layer, a color resist layer, and a second base substrate, the second alignment layer is disposed on the liquid crystal layer, and the color resist layer is disposed on the second alignment layer, and the second base substrate is disposed on the color resist layer,
wherein the light source is disposed near the lateral side of the first base substrate.

14. The display device as claimed in claim 13, wherein the display device includes a middle frame, and the light source is disposed on the middle frame.

15. The display device as claimed in claim 13, wherein a length of the first base substrate is greater than a length of the optical structure layer, and the light source is disposed on the first base substrate.

16. The display device as claimed in claim 13, wherein the light source comprises a blue light emitting diode.

17. The display device as claimed in claim 16, wherein the diffuse reflection layer comprises lattice dots arranged in an array.

18. The display device as claimed in claim 17, wherein the optical structure layer comprises a diffusion sheet and a prism sheet, and the prism sheet is disposed on the diffusion sheet.

19. The display device as claimed in claim 13, wherein the second alignment layer comprises a third metal layer, the third metal layer is etched to form a third metal wire grid, and the third metal wire grid is disposed between the liquid crystal layer and the color resist layer.

20. The display device as claimed in claim 13, wherein the color resist layer includes a color filter layer and a quantum dot layer disposed under the color filter layer, and the color filter layer includes a first color resist, a second color resist, and a transparent color resist.

* * * * *